No. 678,340. Patented July 9, 1901.
J. HOLLAND.
CUSHION TIRE.
(Application filed Nov. 13, 1900.)
(No Model.)

Witnesses
Deniza Matthews
T. W. Johnson

Inventor
Joseph Holland.
By J. R. Nottingham
Attorney

UNITED STATES PATENT OFFICE.

JOSEPH HOLLAND, OF PROVIDENCE, RHODE ISLAND, ASSIGNOR TO WEBBER G. KENDALL, OF SAME PLACE.

CUSHION-TIRE.

SPECIFICATION forming part of Letters Patent No. 678,340, dated July 9, 1901.

Application filed November 13, 1900. Serial No. 36,395. (No model.)

*To all whom it may concern:*

Be it known that I, JOSEPH HOLLAND, a subject of the Queen of Great Britain, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to that class of cushion-tires specially adapted for use on the metal-tired wheel in general use and those wheels having specially-constructed rims, such as the well-known channel and concave rims; and it consists, essentially, of two or more bands or sections of rubber, preferably endless, having interposed between each section a non-elastic securing means for the base and intermediate sections.

The invention further consists of the novel construction and general arrangement of the band-sections, as will be hereinafter more fully described, and particularly stated in the claims.

One of the principal objects of the invention is to improve the general construction and efficiency of this class of tires, so that when the outer section or tread-surface becomes worn or injured it can be readily replaced or renewed without disturbing the remaining sections.

Another object of the invention is to provide a simple and efficient means for securing the tire onto the wheel-rim, such a means as will not require the services of a skilled mechanic and the use of special tools.

Other objects will become apparent upon further description of the invention. Heretofore tires of this character have proven unsatisfactory, for the reason that the means employed to unite the sections together and to secure them onto the wheel proved inadequate.

My invention is especially designed to overcome this very serious objection, and I accomplish it by the interposed securing-bands of non-elastic material, thus providing a practical sectional tire in which the tread-section when worn out may be replaced with a new one.

Figure 1:
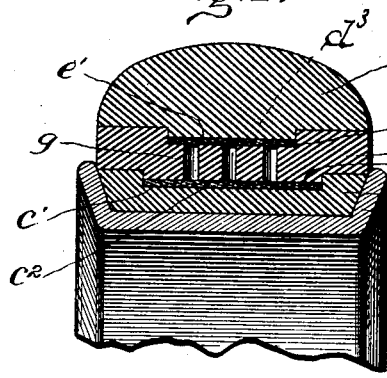
Figure 2:
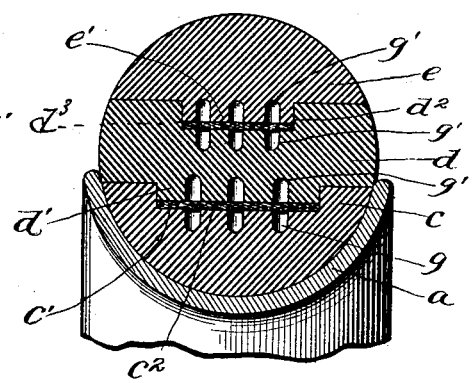
Figure 3:
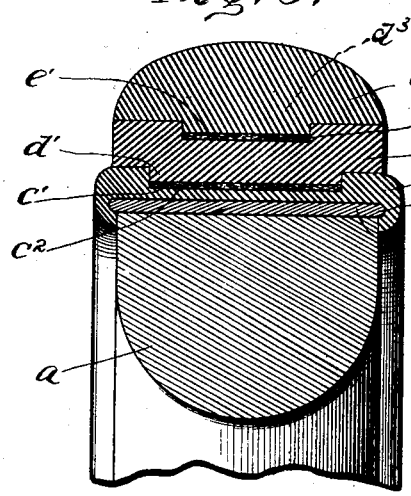

In the accompanying drawings, Figure 1 is a cross-sectional view of my improved tire, showing it applied to one style of specially-constructed rim. Fig. 2 is a similar view showing it applied to another form or style of rim; Fig. 3, a cross-sectional view showing the tire applied to the metal-tired wheel in general use, and Fig. 4 a modified form of my invention.

Figure 4:
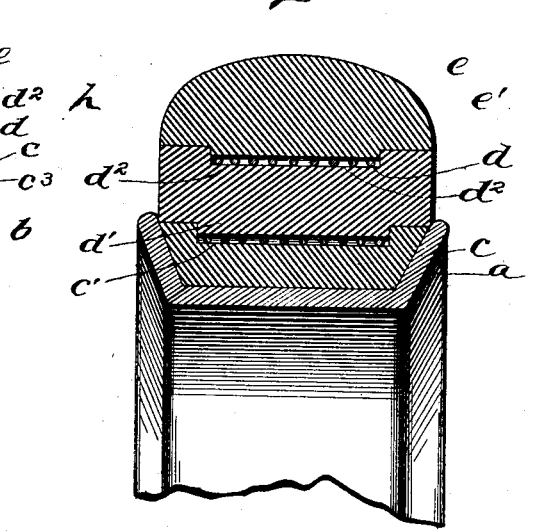

Referring to the several views, the letter $a$ indicates a metallic rim, which may be of any suitable type, either a channeled or concave rim, as shown in Figs. 1, 2, and 4, or it may be a wooden rim, such as shown in Fig. 3, provided with a metal tire $b$.

The cushion-tire is preferably composed of three sections of rubber, each section consisting, preferably, of three endless bands $c$, $d$, and $e$, respectively. The section $c$ forms the base, and in Figs. 1, 2, and 4 it is shown seated in the metallic rim, to which it is securely fastened, as will be hereinafter explained. The base-section or section $c$ has its outer periphery provided with a channel or groove $c'$ to form a seat for intermediate section $d$. The base-section is applied to the rim by stretching, and a non-elastic band $c^2$, preferably canvas, having both sides provided with a suitable cement, is secured within the channel or groove $c'$. This band is drawn tightly around the base-section and has its ends joined together in any suitable or well-known manner, thus securing said section firmly in its seat in the rim. The intermediate section $d$ is formed with a tongue or rib $d'$ on its inner periphery and with a channel or groove $d^2$ in its outer periphery and is applied to the base-section by stretching. When applied, the tongue $d'$ is seated in the channel $c'$ and firmly cemented to the interposed band or strip $c^2$. The intermediate section is further secured to the base-section by a non-elastic band $d^3$, which is placed in the channel $d^2$ and has its ends joined together. The band $d^3$ has both of its surfaces cemented, so that when the tread-section is applied a firm adhesion will take place. The section $e$ has its inner periphery formed with a tongue or rib $e'$, which is seated in the channel or groove $d^2$, and its outer periphery slightly rounded in cross-section to form a suitable tread-surface. The tread-section is also placed in position by stretching, and when in position its tongue will be firmly cemented to the non-elastic band $d^3$. When the several sections are thus united together, they are practically integral and the tire is proof against accidental separation and displacement. Each of the sections is preferably formed of rubber sufficiently vulcanized to give to the tire the required degree of strength and stability without impairing its elastic quality; but if additional elasticity is required the intermediate section may be provided with cushion-chambers, such as perforations $g$, as shown in Fig. 1, or each section with cushion-chambers, such as cavities $g'$, as shown in Fig. 2. In the form shown in Fig. 3 the base-section is, however, made of hard rubber and has its inner periphery provided with a channel or groove $c^3$ to form a seat for the metal tire $b$. In constructing the base-section for this type of wheel it is formed of a split band, so that it may be readily sprung onto the wheel, and its ends are secured together in any well-known manner. When the section is properly seated onto the wheel and its ends secured together, all tending to a sidewise or lateral movement is impossible, as the channel $c^3$ forms a firm seat for the tire $b$.

In the modification shown in Fig. 4 the non-elastic securing means consists of a number of wire bands $h$, with their ends properly joined together. In using the wire bands cement may also be used to join the sections together.

Considerable difficulty has been experienced in securing cushion-tires onto the wheel-rims, especially where the securing-means consists of wires or bands, as the ends of the tire must be crowded or forced back in order to fasten the ends of the wires together. By my invention this objection is overcome, as the band or bands are readily accessible and no difficulty is experienced in fastening their ends together.

It will be noted that the interlocking of the base and intermediate sections is below the side edges or flanges of the rim, which when the sections are secured to the rim prevents any possible lateral movement.

Having thus fully described my invention, what I claim, and desire to secure by Letters Patent, is—

1. A cushion-tire comprising two or more sections of tire-forming material, the adjacent peripheries of the sections being adapted to interlock with each other, by having the periphery of one section provided with an angular-shape channel and the periphery of the other section provided with a correspondingly-shaped tongue or rib, and a non-elastic band interposed between the interlocking parts.

2. A cushion-tire comprising a base-section having a channeled outer periphery, a tread-section having a tongue or rib on its inner periphery, an intermediate section having a tongue or rib adapted to fit the channel in the base-section and a channel to receive the tongue or rib of the tread-section, and non-elastic bands interposed between the base and intermediate sections and between the tread and intermediate sections, whereby the several sections are firmly secured to the wheel.

3. A cushion-tire comprising three interlocking sections of tire-forming material, one or more of said sections being provided with cushion-chambers, and non-elastic bands interposed between the sections, whereby they are firmly secured to the wheel.

4. A cushion-tire comprising a base-section, a non-elastic means for securing the section to the rim of a wheel, an intermediate section interlocked with the base-section, a tread-section interlocked with the intermediate section, and non-elastic means for securing the intermediate section to the base-section, substantially as specified.

5. A cushion-tire comprising three sections of tire-forming material, the base-section being provided with an outer peripheral channel, non-elastic securing means situated in said channel and securing the said base-section onto the wheel, an intermediate section having a tongue or rib adapted to fit the channel in the base-section and having an outer peripheral channel, non-elastic means situated in said channel and securing the intermediate section to the base-section, and a tread-section having a tongue or rib adapted to fit the channel in the intermediate section, substantially as specified.

In testimony whereof I affix my signature in the presence of two witnesses.

JOSEPH HOLLAND.

Witnesses:
 WEBBER G. KENDALL,
 FRANK T. EASTON.